United States Patent [19]

Iihara et al.

[11] Patent Number: 5,544,548
[45] Date of Patent: Aug. 13, 1996

[54] COLD FORMING METHOD OF TOOTHED RING-SHAPED PRODUCTS AND FORMING APPARATUS FOR ITS USE

[75] Inventors: Michio Iihara, Hamamatsu; Osamu Shimizu; Akira Sera, both of Iwata, all of Japan

[73] Assignee: NTN Corporation, Osaka, Japan

[21] Appl. No.: 219,299

[22] Filed: Mar. 28, 1994

[30] Foreign Application Priority Data

Aug. 31, 1993 [JP] Japan ................................. 5-240657
Nov. 30, 1993 [JP] Japan ................................. 5-329894

[51] Int. Cl.⁶ ................................. B21K 1/30; B21J 5/12
[52] U.S. Cl. .................... 76/107.1; 29/893.34; 72/343
[58] Field of Search ........................ 76/117, 107.1, 76/107.4; 29/883.34; 72/343

[56] References Cited

U.S. PATENT DOCUMENTS

| | | | |
|---|---|---|---|
| 4,309,353 | 4/1985 | Ike et al. | 72/343 X |
| 4,546,635 | 10/1985 | Arita et al. | 72/345 |
| 4,924,690 | 5/1990 | Kanamaru et al. | 29/893.34 |

FOREIGN PATENT DOCUMENTS

| | | |
|---|---|---|
| 0163769 | 12/1985 | European Pat. Off. . |
| 0322770 | 7/1989 | European Pat. Off. . |
| 0356118 | 2/1990 | European Pat. Off. . |
| 452042 | 2/1992 | Japan ........................ 72/343 |

Primary Examiner—Douglas D. Watts
Attorney, Agent, or Firm—Birch, Stewart, Kolasch & Birch, LLP

[57] ABSTRACT

A cold forming method for plastic deformation process of toothed ring-shaped products (W0) have a tooth profile portion (T) in at least one of the outer peripheral surface and inner peripheral surface thereof. When processing a ring-shaped product (W0) having a tooth profile portion (T) in the outer peripheral surface, a die (1) is utilized. The die (1) has a tooth forming part (4) having a shape corresponding to the shape of the tooth profile portion (T) of the ring-shaped product (W0) in its inner peripheral surface, and, if necessary, a tip shaping part (5) positioned in the groove of the tooth forming part (4). A ring-shaped material (W) is pressed and passed into the die (1) by a punch (2) in a round shaft shape in the axial direction, and processed. When processing a ring-shaped product (W1) having a tooth profile portion (T) in an inner peripheral surface, the tooth forming part (4) and tip shaping part (5) are provided on the outer circumference of a lower punch (11), and the ring material (W) is pressed and passed into the lover punch (11) by an upper punch (12), and processed.

9 Claims, 13 Drawing Sheets

Fig.4 (A)
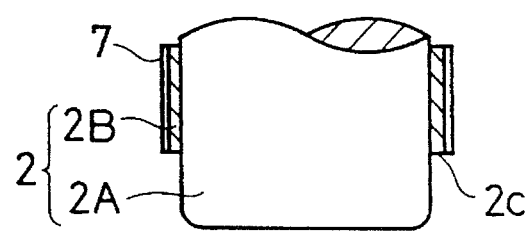
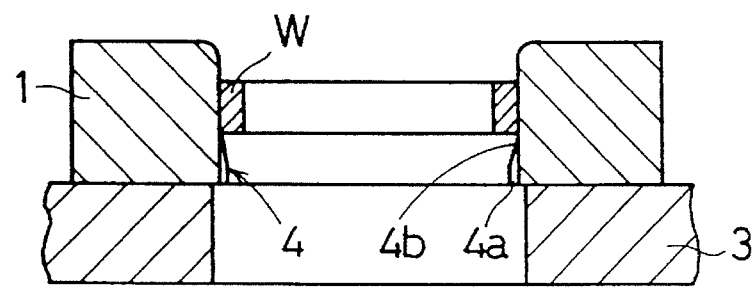
Fig.4 (B)
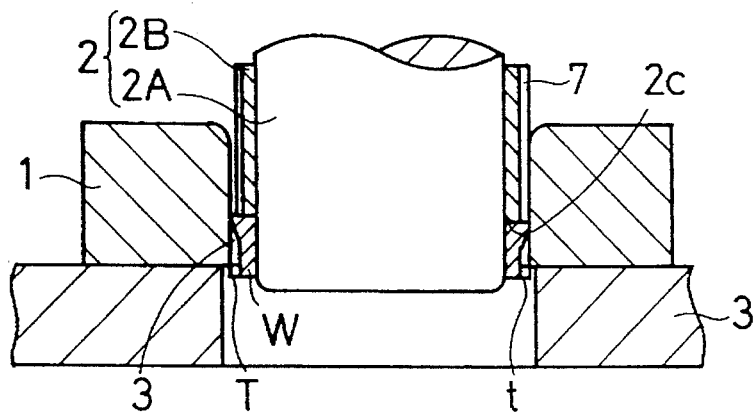
Fig.4 (C)
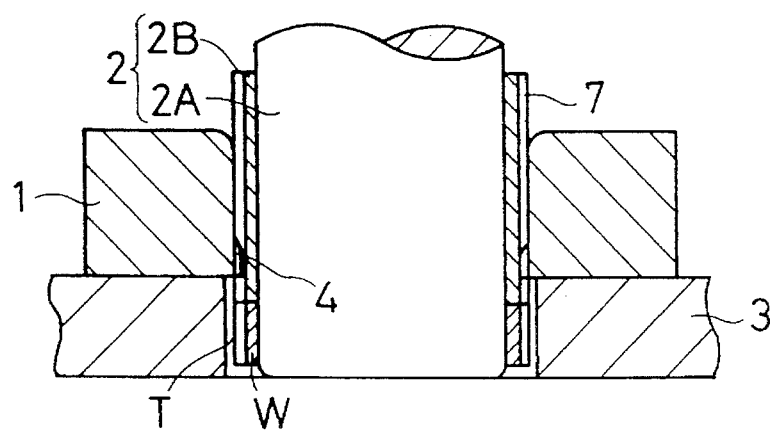

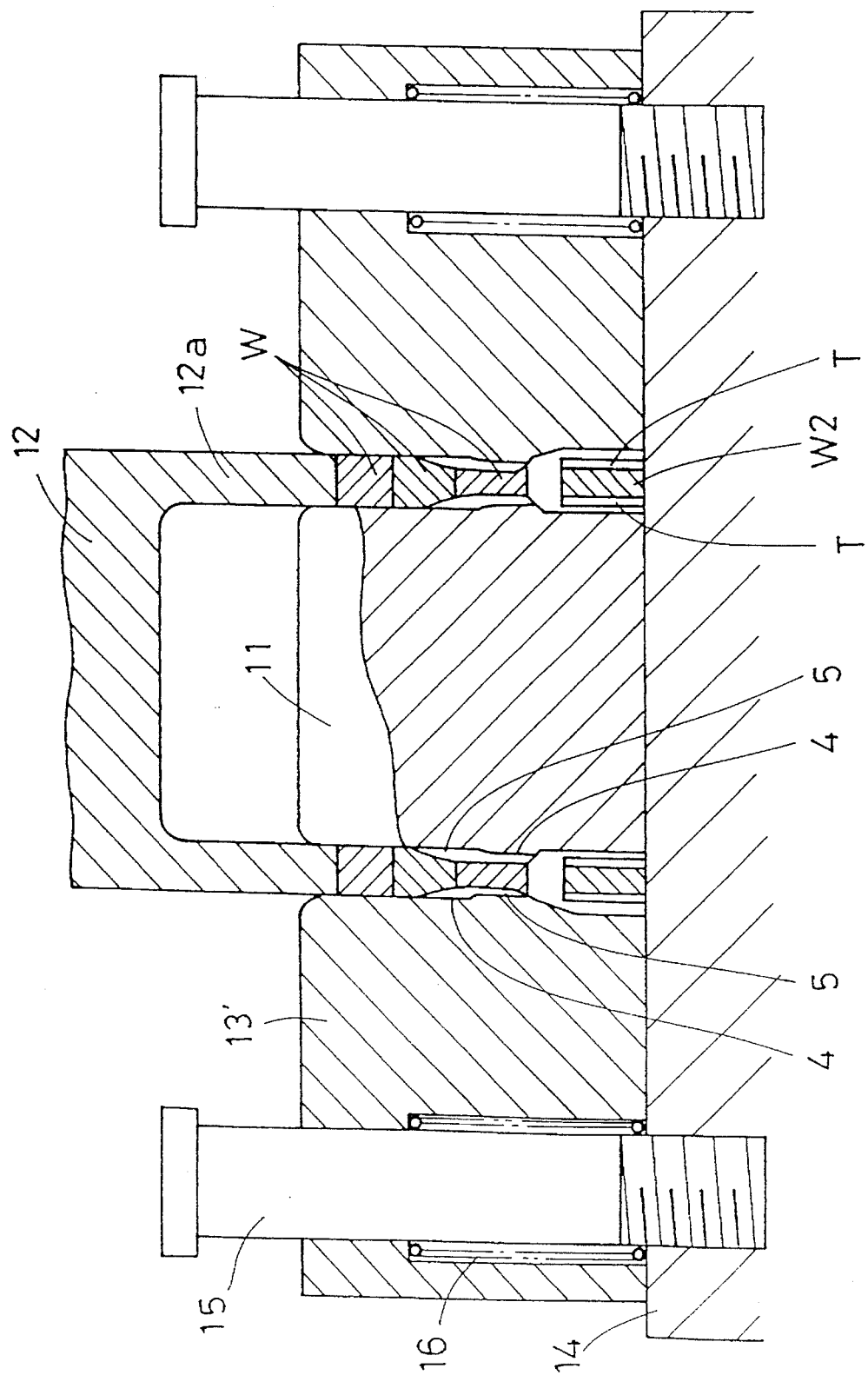

COLD FORMING METHOD OF TOOTHED RING-SHAPED PRODUCTS AND FORMING APPARATUS FOR ITS USE

BACKGROUND OF THE INVENTION

1. Field of the Invention

The present invention relates to a cold forming method of ring-shaped products having a tooth profile such as pulser ring for detection of rotation, external tooth gear, internal tooth gear, and ring-shaped spline.

2. Description of the Prior Art

Ring-shaped products of this type, hitherto, possess a tooth profile formed by machining. Machining however, is poor in productivity and high in manufacturing cost, and therefore plastic deformation processing is desired.

Accordingly, the applicant devised tooth profile forming by squeeze processing as shown in FIG. 14. That is, a material W1 squeezed and formed into a cup shape preliminarily is pushed into a die 51 by using a punch 52, and thereby a tooth profile portion T is processed on the outer peripheral surface of the material W1 by a tooth forming part 53 of tooth profile of the die 51. To form the material W1 into a ring-shaped product, the bottom plate Wa of the material W1 is cut off.

According to this method, the productivity is better than is realized by machining but the material W1 is pulled between the upper end of the tooth forming part 53 of the die 51 and the front end of the punch 52 when forming, and a large tensile stress f acts on a peripheral wall Wb of the material W1, and therefore the peripheral wall Wb of the material W1 is stretched in the axial direction. Accordingly, it is not only difficult to process the formed tooth profile portion T in a sufficient tooth height, but also it was found that the tooth height at the end portion confronting the front end of the punch 52 is lowered due to tapered shrinkage in the tip of the formed tooth profile portion T, thereby failing to obtain an accurate tip shape.

SUMMARY OF THE INVENTION

It is hence a primary object of the invention to present a cold forming method and a forming apparatus of toothed ring-shaped products superior in productivity capable of forming a high tooth height and obtaining an accurate tooth profile shape.

To achieve the object, a cold forming method according to one aspect of the present invention is a cold forming method for plastic processing of toothed ring-shaped products having a tooth profile portion at least in one of the outer peripheral surface and inner peripheral surface, comprising the steps of:

preparing a first forming die provided with a tooth forming part having a shape corresponding to the shape of the tooth profile portion of the ring-shaped product;

preparing a second forming die provided with a pressing part for pressing an end surface of a ring-shaped material; and displacing the first forming die and the second forming die relative to each other in an axial direction while the ring-shaped material is pressed to the pressing part so as to press the ring-shaped material through the tooth forming part of the first forming die in the axial direction, thereby forming the tooth profile portion in the ring-shaped material.

According to this method, since the toothed ring-shaped product is obtained by plastic deformation processing, the productivity is improved compared to machining, so that the manufacturing cost is lowered. Besides, during forming, a compressive load in the axial direction is imposed on the ring-shaped material between the end portion of the tooth forming part of the first forming die and the pressing part of the second forming die, while tensile load does not act. On the other hand, the radial gap between the both forming dies is kept constant due to the general motion of the forming apparatus. Therefore, each tooth of the formed tooth profile portion can be made sufficiently high in the tooth height, while suppressing occurrence of tapered shrinkage in the tip.

In a preferred embodiment of the invention of this forming method, plural ring-shaped materials are overlaid and disposed at one side in the axial direction of the tooth forming part in the first forming die, the end surface of the ring-shaped material of the top layer is pressed by the pressing part of the second forming die, and when forming of the tooth profile portion in the ring-shaped material of the bottom layer is completed and the tooth profile portion is formed halfway in the ring-shaped materials of the second and subsequent layers following the ring-shaped material of the bottom layer, pressing by the second forming die is stopped, and a new ring-shaped material is laid over the ring-shaped material of the top layer.

According to this embodiment, by pressing the ring-shaped material of the top layer by the pressing part of the second forming die, the ring-shaped material of the top layer pushes the ring-shaped material of the bottom layer to pass through the tooth forming part, thereby forming a tooth profile in the ring-shaped material of the bottom layer. Therefore, since it is not necessary to move the pressing part down into the inside or a hollow portion radially inwardly of the tooth forming part, and the outer diameter of the pressing part can be set larger than the inner diameter of the tooth forming part, so that the area of the pressing part can be enlarged. As a result, the ring-shaped material can be formed with a large pressing force, that is, forming force.

A forming method according to another aspect of the present invention is a cold forming method for plastic deformation processing of toothed ring-shaped products possessing a tooth profile portion at least in one of the outer peripheral surface and inner peripheral surface, comprising the steps of:

preparing a forming die possessing a tooth forming part having a shape corresponding to the shape of the tooth profile portion of the ring-shaped product, and a tip shaping part for pressing and squeezing a top land of the tooth profile portion in the radial direction, being located in the groove of the tooth forming part; and forming the tooth profile portion in a material by pressing the material through the forming die in the axial direction.

According to this forming method, since the toothed ring-shaped product is obtained by plastic deformation processing, the productivity is improved compared to machining, and the manufacturing cost is lowered. In the initial phase of forming of the tooth profile portion of the ring-shaped material, the tip of the tooth profile portion tends to shrink in a taper form, but the top land having this shrinkage is aligned to a specified height by the tip shaping part. Hence, an accurate tooth profile is obtained.

In a preferred embodiment of invention, a ring-shaped material is used and it is pressed through the forming die by pressing an end surface of the material to form the tooth profile portion therein.

The forming apparatus used in this forming method for forming toothed ring-shaped products possessing a tooth profile portion at least in one of the outer peripheral surface and inner peripheral surface, comprises a forming die for forming the tooth profile portion in a material by having the material pressed through the forming die in the axial direction, wherein the forming die comprises a tooth forming part having a shape corresponding to the shape of the tooth profile portion of the ring-shaped product, and a tip shaping part located in the groove of the tooth forming part for pressing and squeezing the top land of the tooth profile portion in the radial direction.

According to a preferred embodiment of the invention, the tip shaping part is extended in the pushing direction of the ring-shaped material from the intermediate part in the axial direction of the tooth forming portion.

BRIEF DESCRIPTION OF THE DRAWINGS

In any event, the present invention will become more clearly understood from the following description of preferred embodiments thereof, when taken in conjunction with the accompanying drawings. However, the embodiments and the drawings are given only for the purpose of illustration and explanation, and are not to be taken as limiting the scope of the present invention in any way whatsoever, which scope is to be determined by the appended claims. In the accompanying drawings, like reference numerals are used to denote like parts throughout the several views.

FIG. 13 is a sectional view of a forming apparatus in a sixth embodiment.

DETAILED DESCRIPTION OF THE PREFERRED EMBODIMENTS

Figure 2:
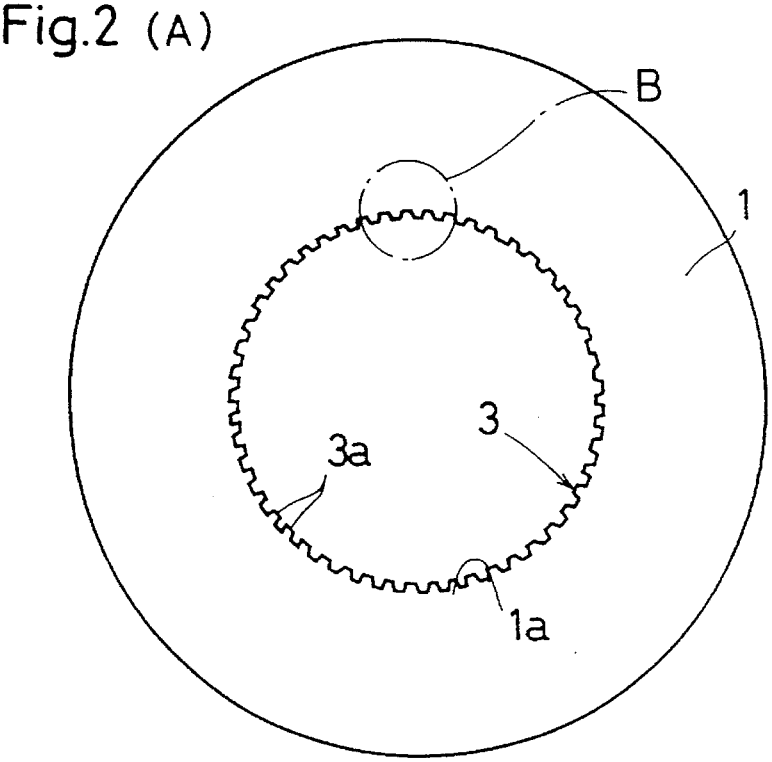
FIG. 2(A) is a plan view of a die used in the first embodiment forming method.
FIG. 2(B) is an enlarged plan view of FIG. 2(A).
Figure 2:
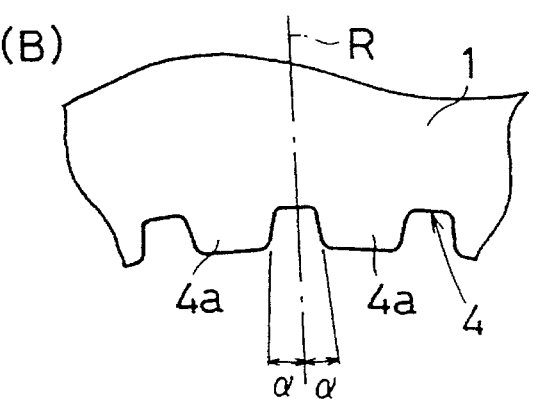
Figure 3:
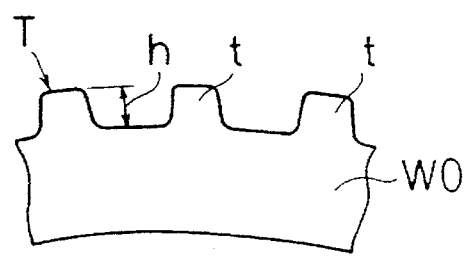
FIG. 3 is a plan view of a part of ring-shaped product formed by the first embodiment forming method.

A first embodiment of the invention is described below by referring to FIG. 1 through FIG. 3. This method is a plastic deformation processing method for producing a ring-shaped product W0 having a tooth profile portion T in the outer peripheral surfaced as partly shown in FIG. 3, from a ring-shaped material W (FIG. 1) obtained by slicing a cylindrical material. The ring-shaped product W0 is, for example, used as a pulser ring for detection of rotation, as when fitted to a the rotary shaft. The ring material W is made of metal such as soft steel, stainless steel or the like.

In this forming method, a die 1 to be used as a first forming die and a round-bar punch 2 as a second forming die are used. The die 1 is mounted on a die holder 3, and the punch 2 is moved up and down relative to the die 1 by a driving device (not shown). The die 1 has a hole and projects a tooth forming part 4 for forming the tooth profile in the lower part of the inner peripheral surface 1a of the hole. The inner diameter of the die 1 is set to be a value for loosely fitting the ring-shaped material W. The tooth forming part 4, as shown in FIG. 1 (B) which is an enlarged view of part B in FIG. 2(A), is in a shape to be matched with the tooth profile of the completed ring-shaped product W0, and the side surface of each tooth part 4a forming a part of the tooth forming part 4 has a slight inclination angle $\alpha$ to the radial direction R. The upper end face 4b (FIG. 1) of each tooth part 4a protrudes from the inner peripheral surface (base surface) 1a of the die 1, and is formed as a slope inclining toward the pushing direction P (downward in FIG. 1) of the punch 2.

The punch 2 in FIG. 1 is a stepped round shaft, and the step surface of the shoulder is a pressing part 2c. The front end 2a of smaller diameter of the punch 2, or a shape-keeping part 2a, has a diameter to be matched with the inner peripheral surface Wd of the ring-shaped material W so as to be inserted in a hole formed by the inner surface Wd. The outer diameter of the shell 2b of large diameter, or the outer diameter of the pressing part 2c, is set to be larger than the inner peripheral surface Wd, and slightly smaller than the inner diameter of the minimum inner diameter portion of the tooth forming part 4 of the die 1.

In the die holder 3, a stripper claw 25 is provided so as to be free to come in and out of the hole in the die holder 3. An elastic biasing force produced by spring 26, for example, urges the stripper claw toward a position in which it protrudes radially inwardly into a hole in die holder 3 which is aligned coaxially with the hole in die 1. The stripper claw 25 has its front end surface sloped inclining in the pushing direction P radially inwardly of the die 1, and the upper end of the inclined front end, that is, the end portion in the backward direction Q of the punch 2, is at a slightly retracted position from the inner peripheral surface 1a of the die 1. Thus, the stripper claw 25 is pushed to contact the outer peripheral surface of the toothed ring-shaped product W0, formed in a manner to be mentioned later, by the elastic force of the return spring 26.

Figure 1A:
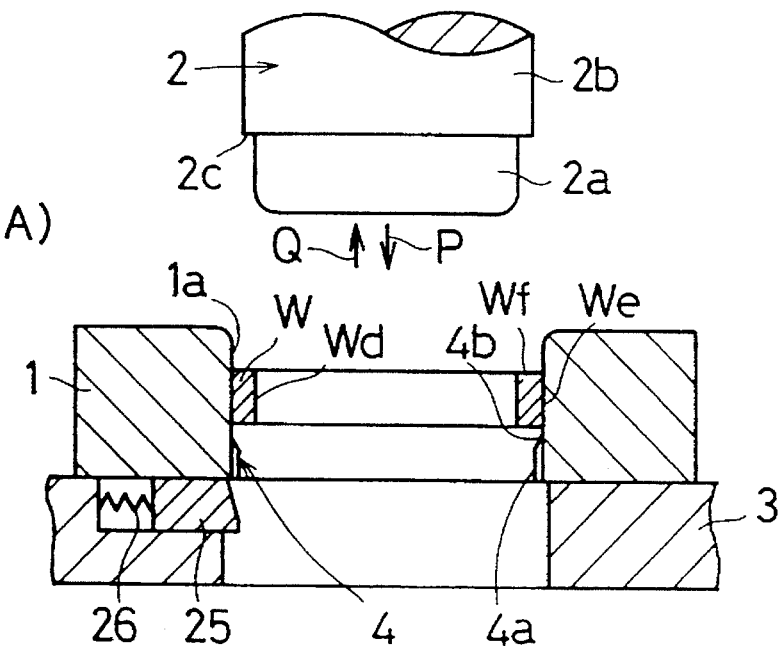
FIGS. 1(A) to (C) illustrate a forming method in a first embodiment of the invention.
Figure 1B:
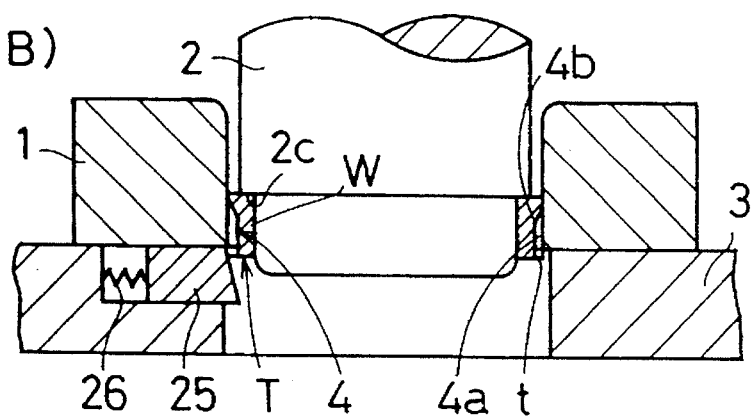

At the outset of the forming process, as shown in FIG. 1(A), the ring-shaped material W is put into the die 1. The ring-shaped material W is located above each tooth part 4a of the tooth forming part 4. When the punch 2 is lowered as shown in FIG. 1(B), the ring-shaped material W is pushed at its end surface Wf and lowered by the pressing part 2c of the punch 2, and a tooth profile portion T consisting of multiple teeth t is plastically formed in the outer peripheral surface We of the ring-shaped material W by the tooth forming part 4 of the die 1. During the formation of the tooth profile portion T, the shape-keeping part 2a of the punch 2 is engaged with the inner peripheral surface Wd to support it so as to suppress a deformation emerging in the surface Wd and hence, the shape of the material is kept appropriate, thereby facilitating the formation. When the ring-shaped material W is lowered until drawn out of the die 1, that is, when the pressing surface 2c is moved from the upper side (one side) to the lower side (the other side) of the tooth forming part 4 in the axial direction thereof, the ring-shaped material W is formed into a toothed ring-shaped product W0 having the tooth profile formed in the entire width in the axial direction.

Figure 1C:
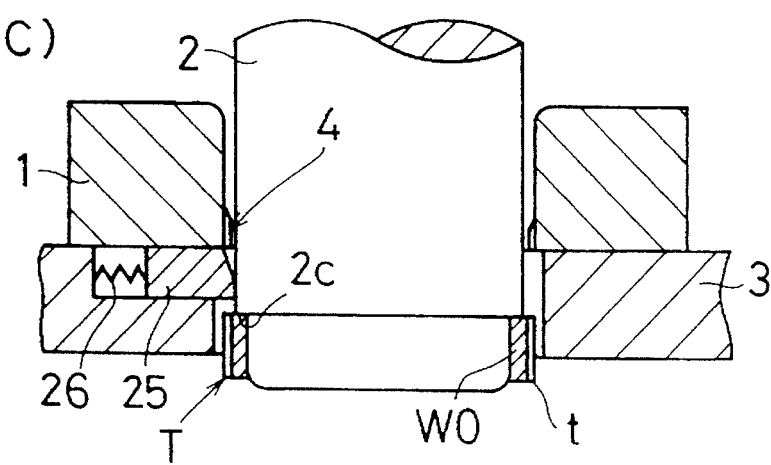

During the downward movement of the ring-shaped material W, the toothed ring-shaped product W0 moves to the lower side while the stripper claw 25 is pushed radially outwardly by the outer peripheral surface of the material W. The punch 2 lowers the ring-shaped product W0 further lower than the stripper claw 25 as shown in FIG. 1(C), and returns upward. Along with this upward motion, the ring-shaped product W0 is hooked on the stripper claw 25, and is dislocated from the punch 2 and drops.

Thus, the tooth profile portion T is formed on the outer peripheral surface of the ring-shaped material W by plastic deformation processing, and accordingly, the productivity is enhanced as compared with machining. In this forming process, since the ring-shaped material W is pressed by the pressing part 2c of the punch 2, only the compressive load in the axial direction acts on the ring material W, and no pulling force acts in the axial direction. Due to the general motion of plastic deformation processing apparatus of this sort, the radial gap between the die 1 and the punch 2 is kept constant Accordingly, each tooth t of the formed tooth profile portion T can be set sufficiently high, and tapering of the tip in the axial direction may be alleviated.

Thus formed ring-shaped product W0 has its inner peripheral surface formed by a smooth cylindrical surface, and in contrast to a toothed ring-shaped product which may be obtained by forming the peripheral wall of thin wall ring material in corrugation by conventional squeezing processing, there is no undulation in the inner peripheral surface, and hence the strength is enhanced, so as not to be deformed easily during the actual use.

This embodiment is suited to the ring-shaped product W0 having relatively shallow grooves in the tooth profile portion T, thus requiring a smaller forming force, as compared with other embodiments to be mentioned later.

Figure 4:
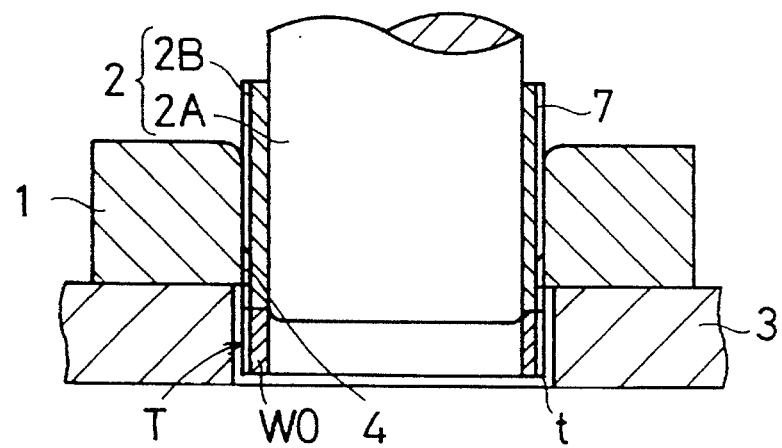
FIGS. 4(A) to (D) illustrate a forming method in a second embodiment.
FIG. 4(E) is a horizontal sectional view showing essential parts of the forming die.
Figure 4:
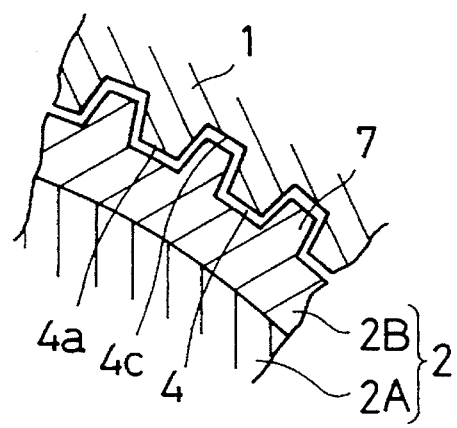

FIG. 4 shows a second embodiment of the present invention. This embodiment is suited to a method to form the ring-shaped product W0 having relatively deep grooves in the tooth profile portion T where a medium forming force is required. In this method, on the outer peripheral surface of the pressing part 2c of the punch 2 in FIG. 4(A), a plurality of protrusions 7 each confronting the associated groove 4c of the tooth forming part 4 of the die 1 in the axial direction are formed as shown in FIG. 4(E) thereby increasing the area of the pressing part 2c of the punch 2. By thus increasing the pressing area, if the forming force is increased, the ring-shaped material W is not crushed by the pressing part 2c, or step surface, of the punch 2. The punch 2 is divided into a mandrel 2A and its outer tubular punch 2B, and both 2A and 2B are relatively slidable in the axial direction.

In the method of this embodiment, when the punch 2 further descends after the tooth profile portion T begins to be formed in the ring-shaped material W as being pushed by the punch 2 as shown in FIG. 4(B), each protrusion 7 of the punch 2 is fitted into the groove 4C of the tooth forming part 4 of the die 1 (see FIG. 4(E)), and moves downward. When the ring-shaped product W0 is formed completely as shown in FIG. 4(C), only the mandrel 2A is raised or moved to the upper side of the tooth forming part 4, ahead of the cylindrical punch 2B as shown in FIG. 4(D). As a result, the ring-shaped product W0 reliably slips off the mandrel 2A, and drops.

Figure 5:
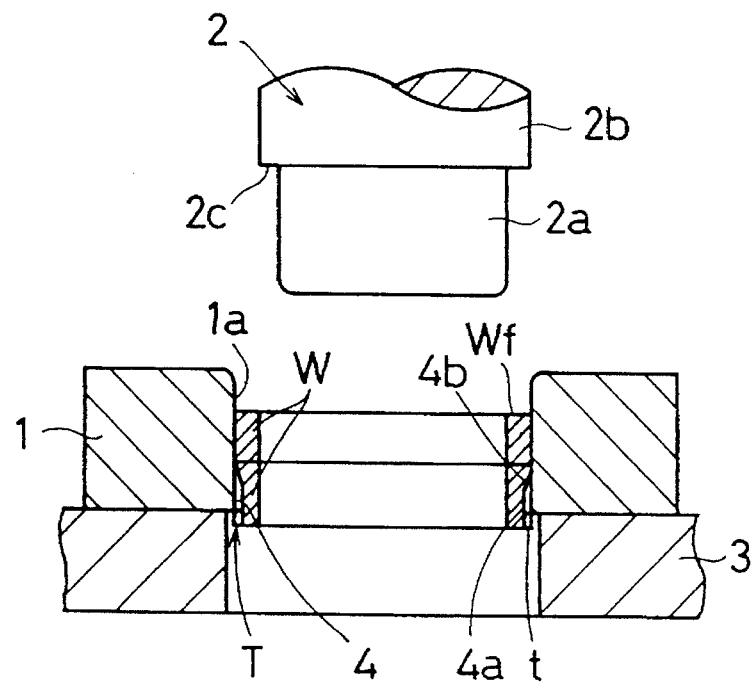
FIGS. 5(A) to (C) illustrate a forming method in a third embodiment
Figure 5:
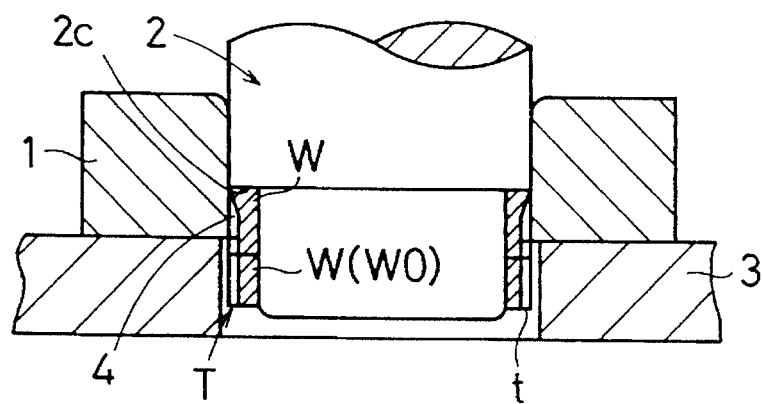
Figure 5:
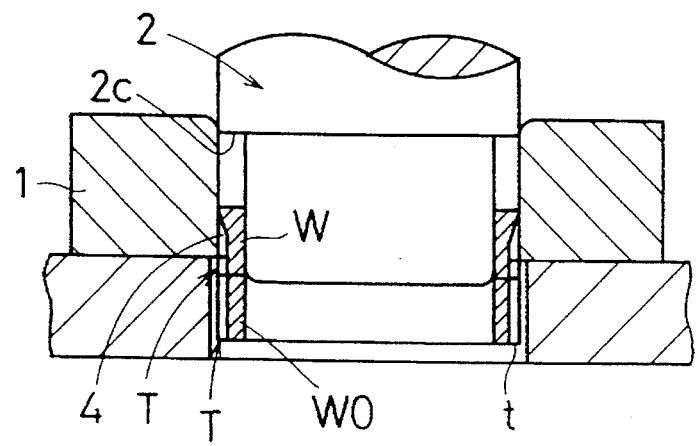

FIG. 5 shows a third embodiment This embodiment is suited to a method to form the ring product W0 having deep grooves in the tooth profile portion T where a large forming force is required. In this embodiment, the outer diameter of the shell 2b of the punch 2, that is, the outer diameter of the pressing part 2c is set larger than the inner diameter of the tooth forming part 4 of the die 1, being nearly same as the inner diameter of the inner peripheral surface (base surface) above the tooth forming part 4. A plurality of ring-shaped materials W, two pieces, for example, are overlaid as shown in the drawing, and disposed in the die 1, and these two ring-shaped materials W in overlaid state are pressed by the punch 2. At this time, as shown in FIG. 5(B), forming of the lower ring-shaped material W is completed, and lowering of the punch 2 is stopped at a position where half the tooth profile portion T of the upper ring-shaped material W is formed. That is, lowering of the punch 2 is stopped before the pressing part 2c of the punch interferes with the tooth forming part 4 of the die 1. After raising the punch 2 and dropping the lower ring-shaped product W0, the punch 2 is further elevated to return to the upper end position in FIG. 5(A), and a new ring-shaped material W is laid on the ring-shaped material W left in the die 1 in the process of forming. Then, the steps of FIG. 5(A) to (C) are repeated.

In the method of this embodiment, since the entire end surface Wf of the ring-shaped material W is pressed by the pressing part 2c of the punch 2, a large pressing force can be applied without crushing the ring-shaped material W. Accordingly, it can be applied when deep grooves form the tooth profile portion T of the ring-shaped product W0.

In the first to third embodiments, it is designed to form tooth by moving the punch 2, but the die 1 may be moved in the axial direction while fixing the punch 2, or both of the die 1 and the punch 2 may be displaced relatively in the axial direction. The punch 2 and die 1 may be disposed upside down.

A fourth embodiment employs a forming method capable of reliably eliminating a tapered shrinkage that may occur on the tooth tips of the ring-shaped product W0.

In FIG. 6(A), the die 1 comprises, in the lower part of the inner peripheral surface 1a of the cylindrical shape, a tooth forming part 4 having a shape corresponding to the tooth shape of the tooth profile portion T of the ring-shaped product W0, and a tip shaping part 5 positioned in the groove of the tooth forming part 4. The diameter of the inner peripheral surface 1a of the die 1 is set so that the ring-shaped material W may be fitted loosely.

Figure 7:
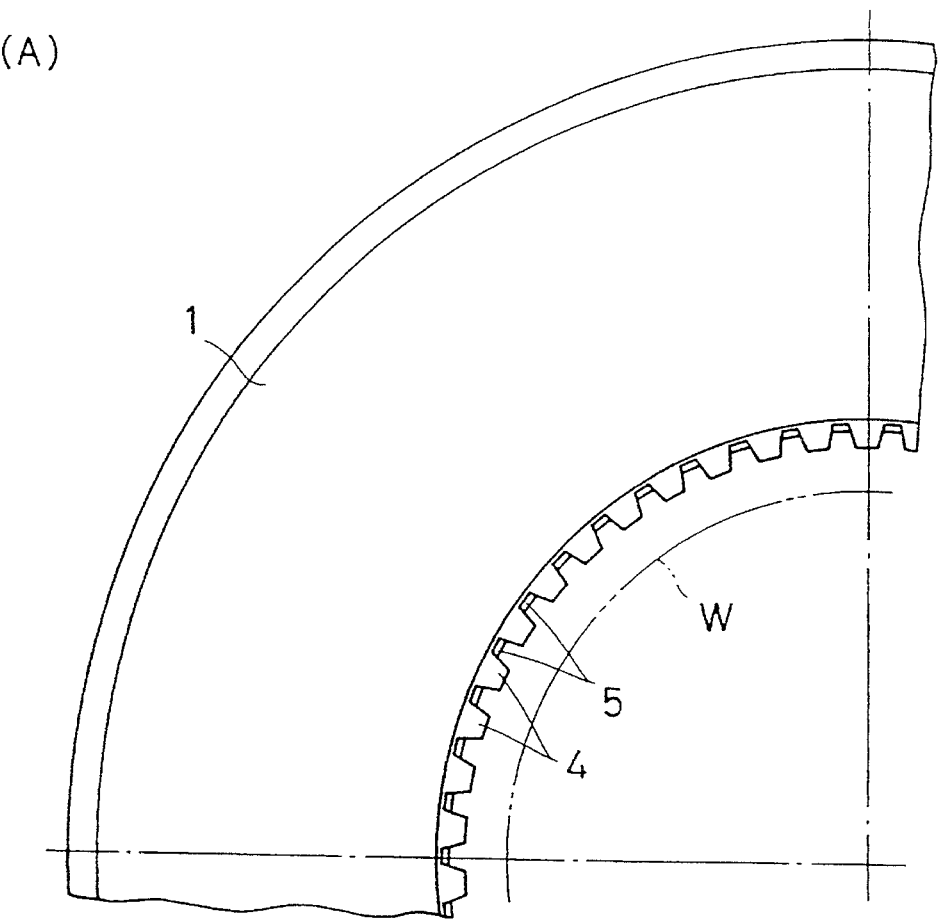
FIG. 7(A) is a partially enlarged plan view of the fourth embodiment forming die.
FIG. 7(B) is its partially enlarged sectional view.
Figure 7:
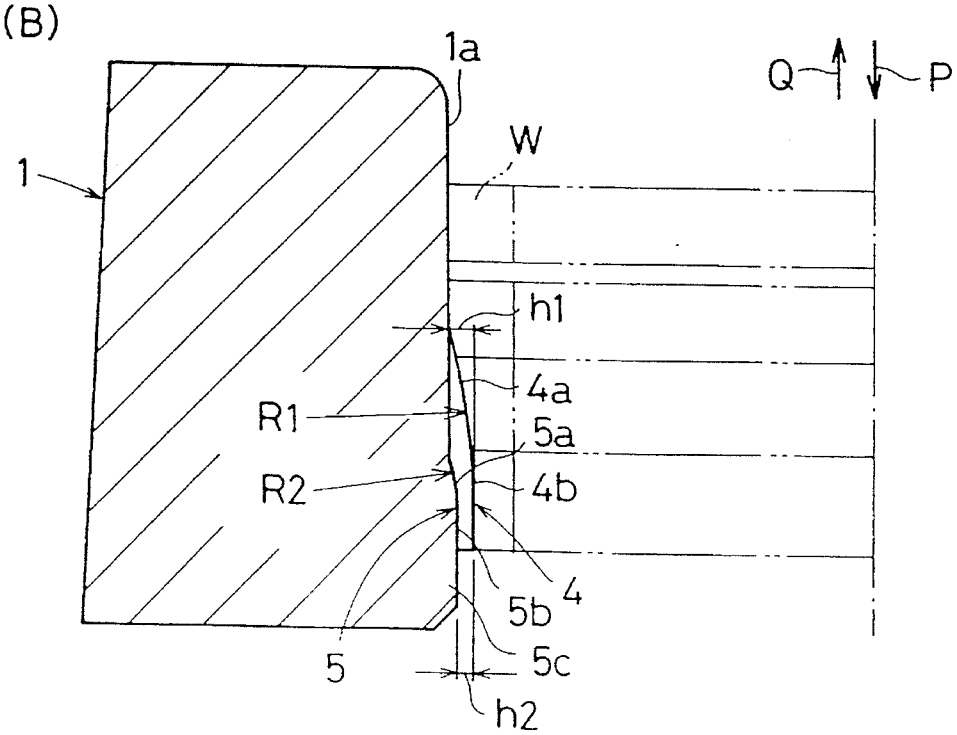

The tooth forming part 4 is provided at a constant pitch in the circumferential direction, and the cross sectional shape thereof is trapezoidal. The longitudinal sectional shape of the tooth forming part 4 is shown in an enlarged view in FIG. 7(B), in which the upper part 4a of the projecting front end surface of the tooth forming part 4 is formed in an arc shape with a radius of R1, projecting gradually farther from the inner peripheral surface (base surface) 1a in the pressing direction P of the punch 2, and the lower part 4b is formed straight, extending parallel to the axial direction. The projecting height h1 of the tooth forming part 4 is set to be such a value that the top land of the tooth forming part 4 may define the bottom of the grooves in the tooth formation on the ring-shaped product W0.

The tip shaping part 5 extends from the middle part in the axial direction of the tooth forming part in the pushing direction P of the punch 2. The longitudinal sectional shape of the tip shaping part 5 is formed in an arc shape with a radius R2, projecting gradually farther in the pressing direction P of the punch 2 from the inner peripheral surface 1a in its upper part 5a while the lower part 5b is formed straight extending parallel to the axial direction. The portion 5c of the tip shaping part 5 positioned below the tooth forming part 4 may be formed in a continuous cylindrical shape extending on the whole circumference of the die 1, or may have segments corresponding to the interval between the adjacent tooth forming parts 4, 4. The projecting height of the tip shaping part 5 is set to be such a value that the difference h2 in height between the tooth forming part 4 and the tip shaping part 5 may be nearly same as the tooth height h of the ring-shaped product W0(see FIG. 3).

Figure 6:
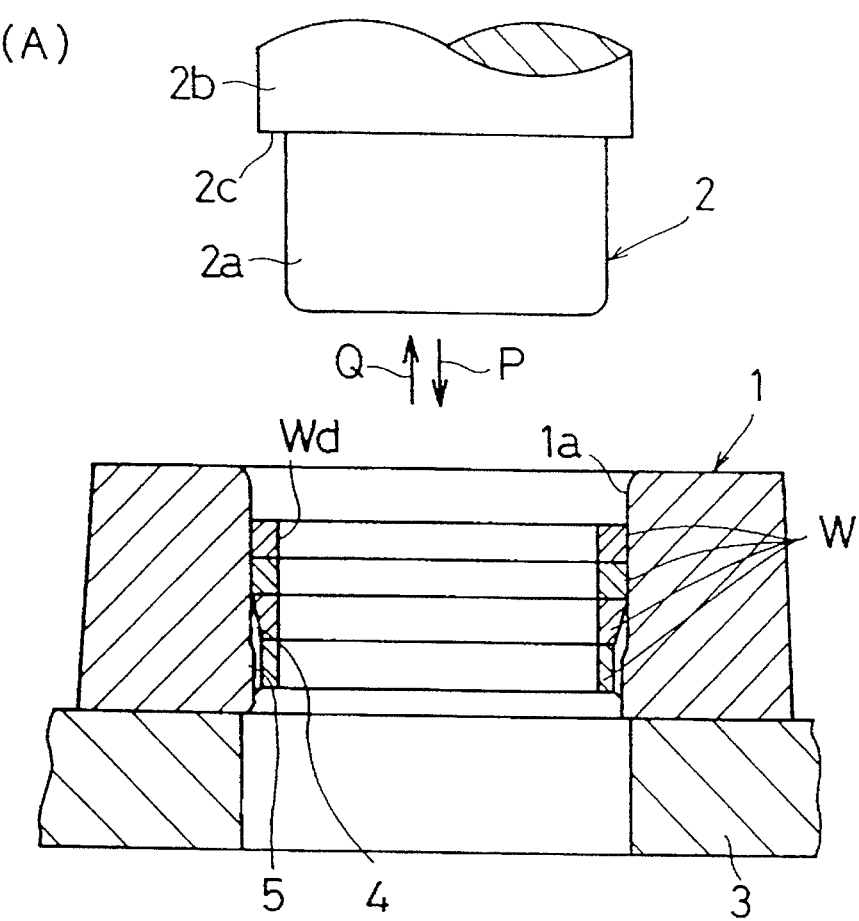
FIGS. 6(A) and (B) illustrate a forming method in a fourth embodiment
Figure 6:
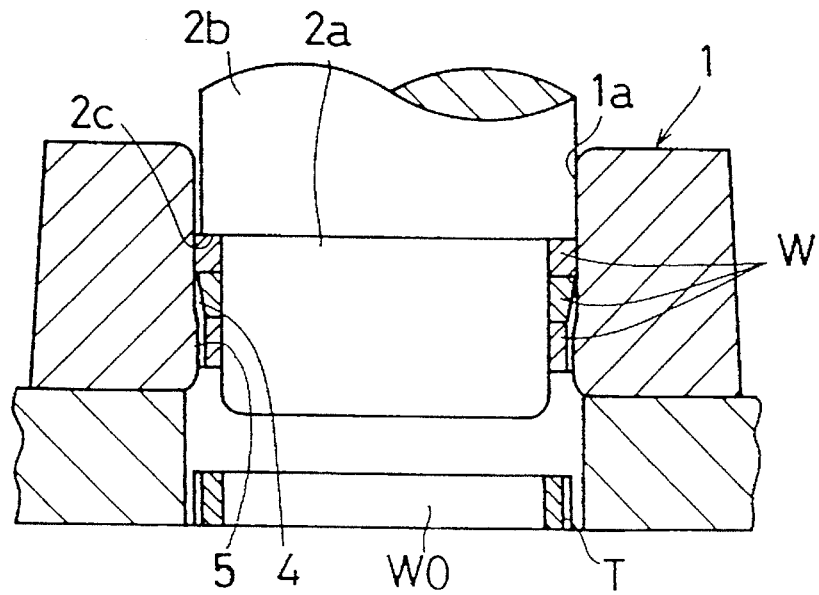

As shown in FIG. 6, the punch 2 is a stepped round shaft, and the shoulder end surface is set to be a pressing part 2c. The front end 2a of smaller diameter of the punch 2 has a diameter matched with the inner peripheral surface Wd of the ring-shaped material W, while the shell 2b of larger diameter has a larger diameter than the inner peripheral surface Wd, and a slightly smaller diameter than the inner peripheral surface 1a of the die 1.

The forming method is described below. In this method, ring-shaped materials W are sequentially pressed into the die 1, as shown in FIG. 6 (A), and while a plurality of materials W in the midst of processing are in the die 1, the press forming is carried out. That is, one ring-shaped material W is put into the die 1, and is pressed in by the punch 2 by the height corresponding to the thickness of one ring-shaped material W as shown in FIG. 6(B). Three materials W in the midst of processing are left over in the die 1, and the material W in the bottom is discharged beneath the die 1 as a completed toothed ring-shaped product W0.

Figure 8:
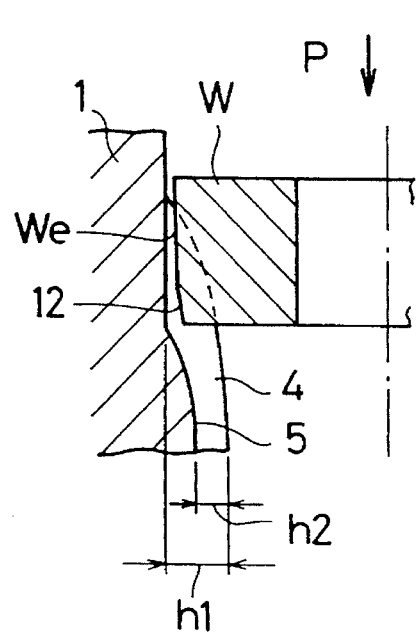
FIGS. 8(A) to (C) are longitudinal sectional views showing the action in the fourth embodiment forming method.
Figure 8:
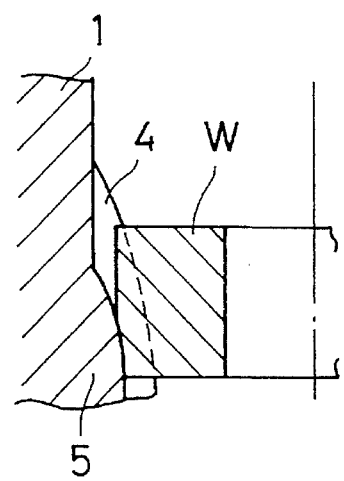
Figure 8:
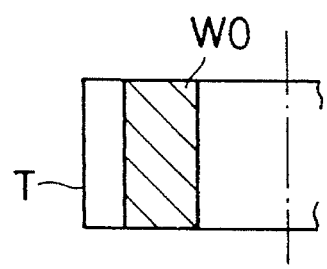

By thus pressing out, the outer peripheral surface of the material W is squeezed by the tooth forming part 4 to be shaped in a tooth profile. In this case, as shown in FIG. 8(A), in early phase of processing, on the outer peripheral surface We of the material W, that is, on the top land, a tapered shrinkage 12 reducing the tooth height of a lower portion positioned on the leading side with respect to the pressing direction P tends to occur. This shrinkage 12 is compensated as the top land is pressed and squeezed inward in the radial direction by the tip shaping part 5, so that the outer diameter of the top land, that is, the outer diameter of the ring-shaped material W is adjusted to the specified diameter. Accordingly, the completed toothed ring-shaped product W0 has an accurate tooth profile without shrinkage in the tip, as shown in FIG. 8(C).

Figure 9:
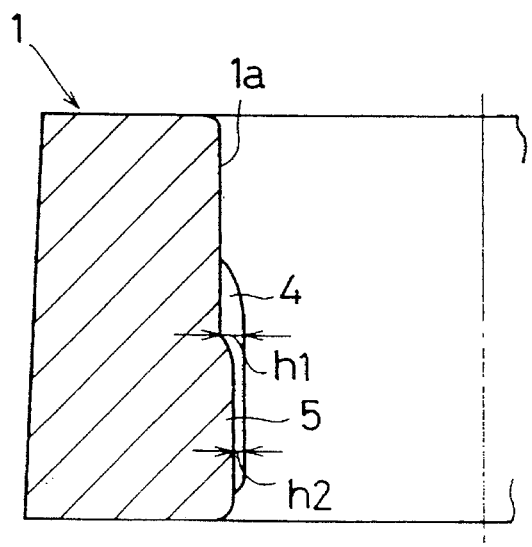
FIG. 9 is a longitudinal sectional view showing a modified embodiment of the tooth shaping part
Figure 14:
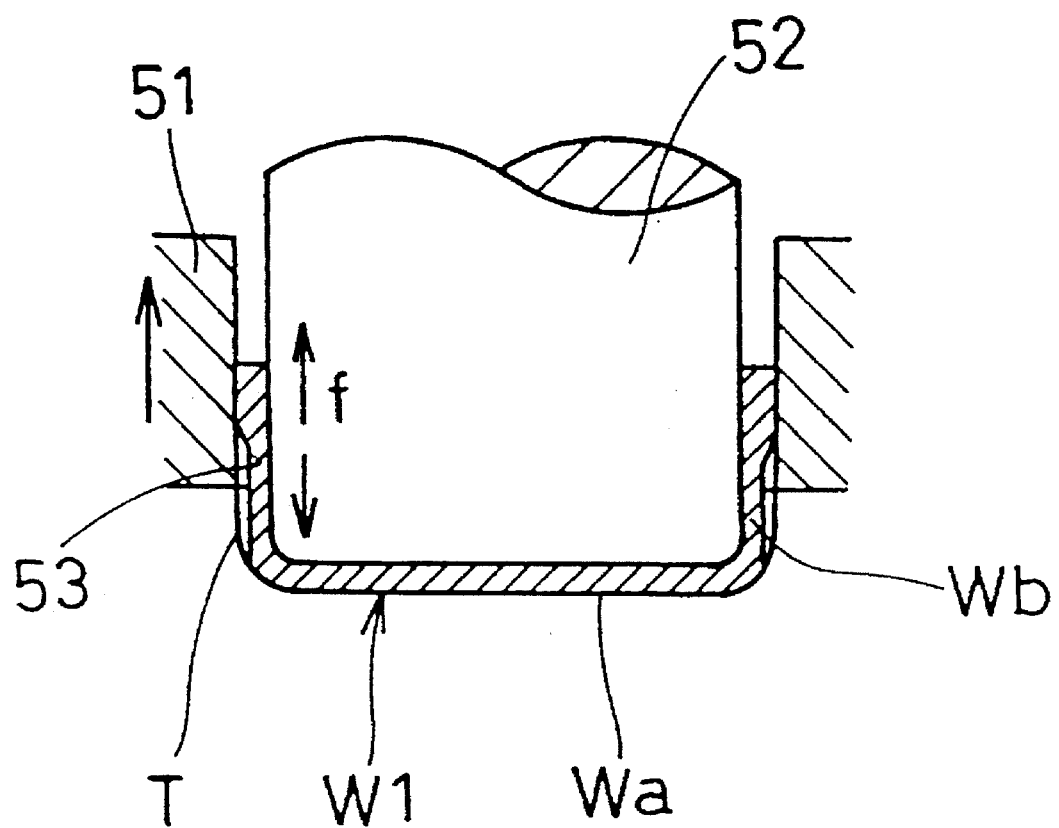
FIG. 14 is a longitudinal sectional view showing a proposed example by the applicant about the cold forming method of toothed ring-shaped products.

If the tooth height of the tooth profile of the ring-shaped product W0 is high, the degree of shrinkage of the outer peripheral surface We increases. In this casey as shown in FIG. 9, by increasing the projection height of the tooth forming part 4, an accurate tooth profile can be obtained. That is, the projecting height h1 of the tooth forming part 4 is set larger relative to the difference h2 in height between the tooth forming part 4 and tip shaping part 5. In this forming method, only a compressive load in the axial direction acts on the material W in the process of forming, and tensile load does not act, and therefore the degree of shrinkage of the outer peripheral surface We shown in FIG. 8(A) is smaller as compared with the proposed example in FIG. 14. Accordingly, with the provision of the tip shaping part 5, it is feasible to increase the tooth height of the tooth profile portion T.

According to this forming method and forming apparatus, a ring-shaped product W0 having an accurate tooth profile can be obtained by plastic deformation processing. Hence, the processing time is shortened, and the material yield increases, which leads to saving of processing cost.

Figure 10:
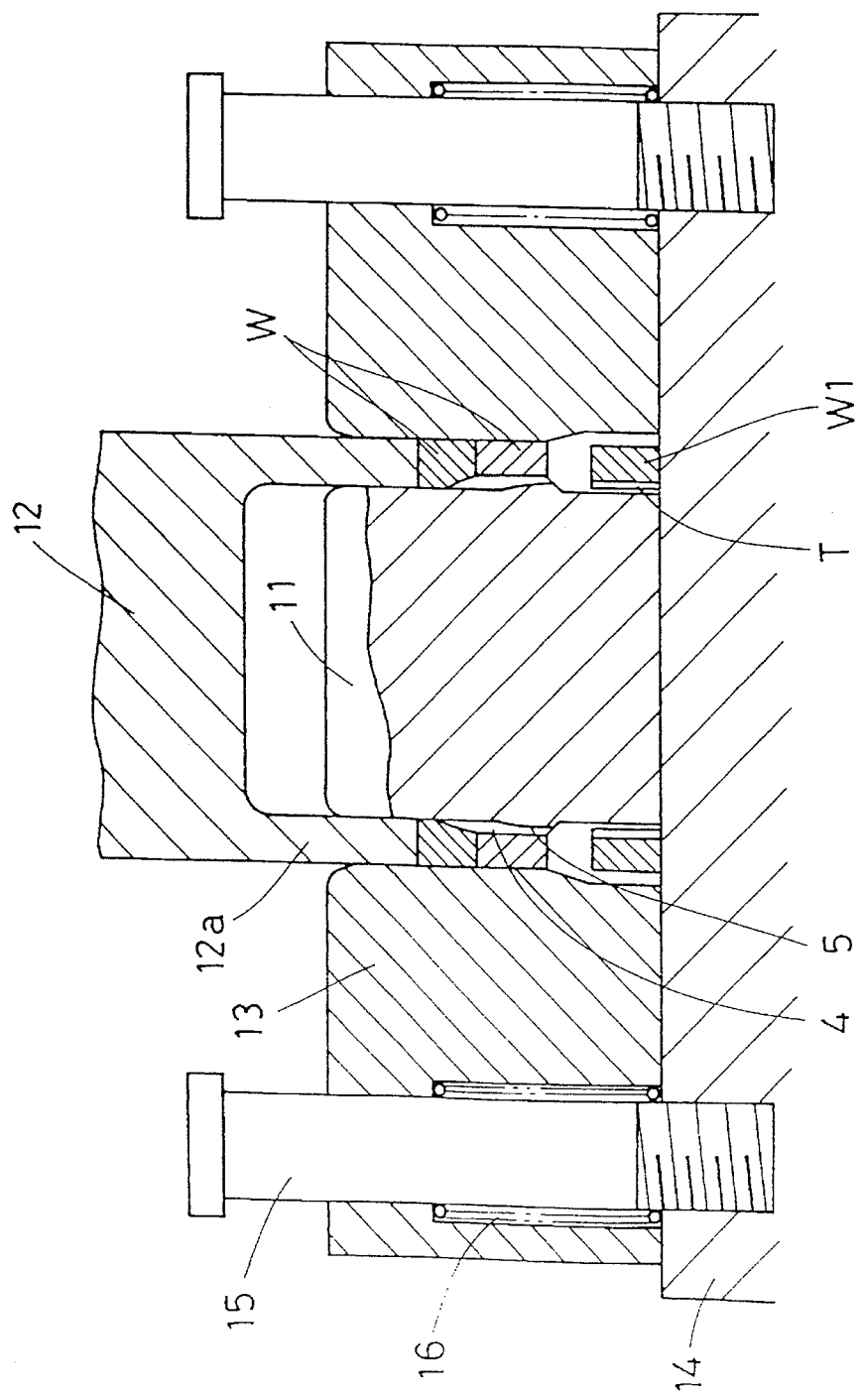
FIG. 10(A) is a longitudinal sectional view showing a forming apparatus in a fifth embodiment.
FIG. 10(B) is a partial plan view showing a ring-shaped product.
Figure 11:
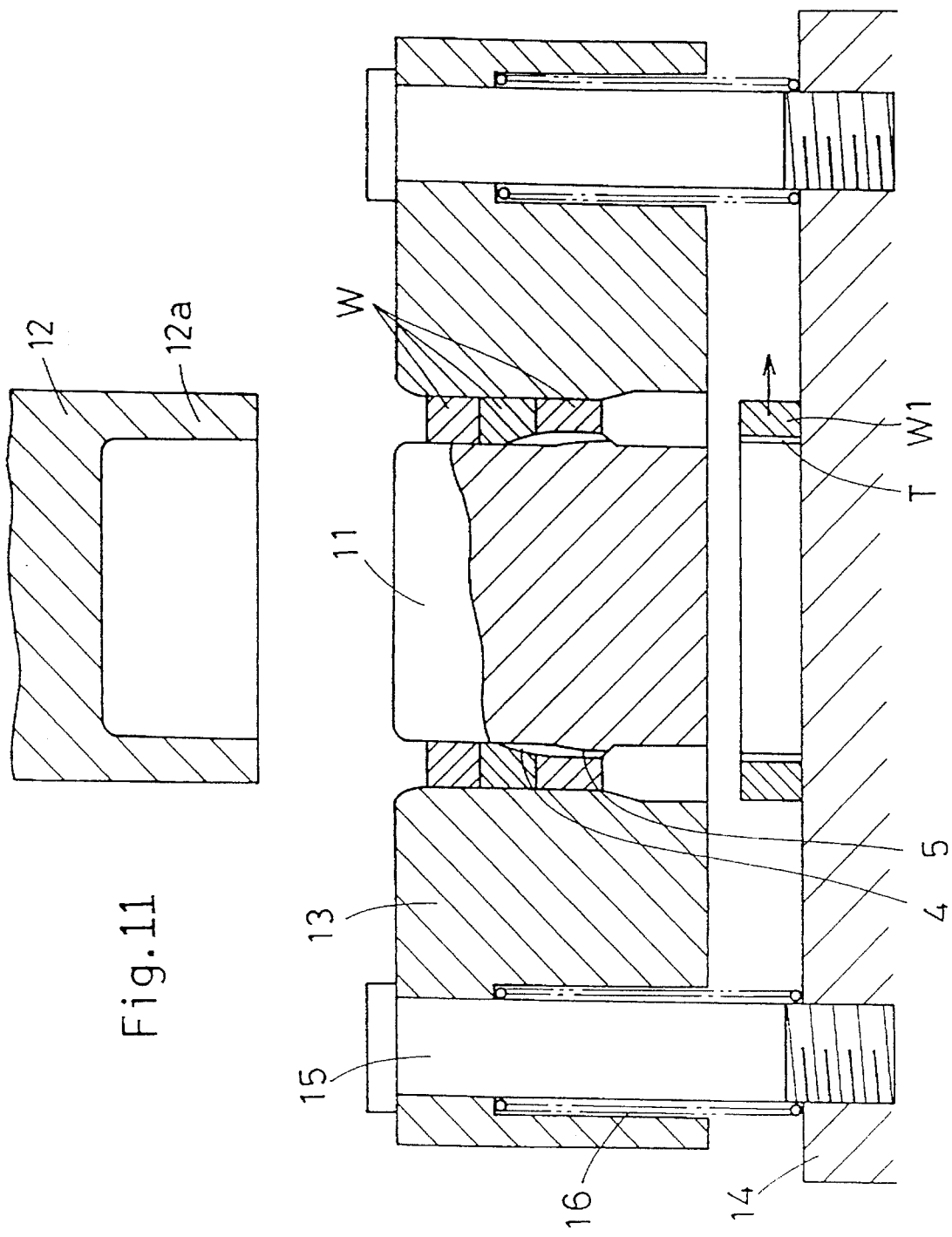
FIG. 11 is a longitudinal sectional view showing the action of the fifth embodiment forming die.
Figure 12A:
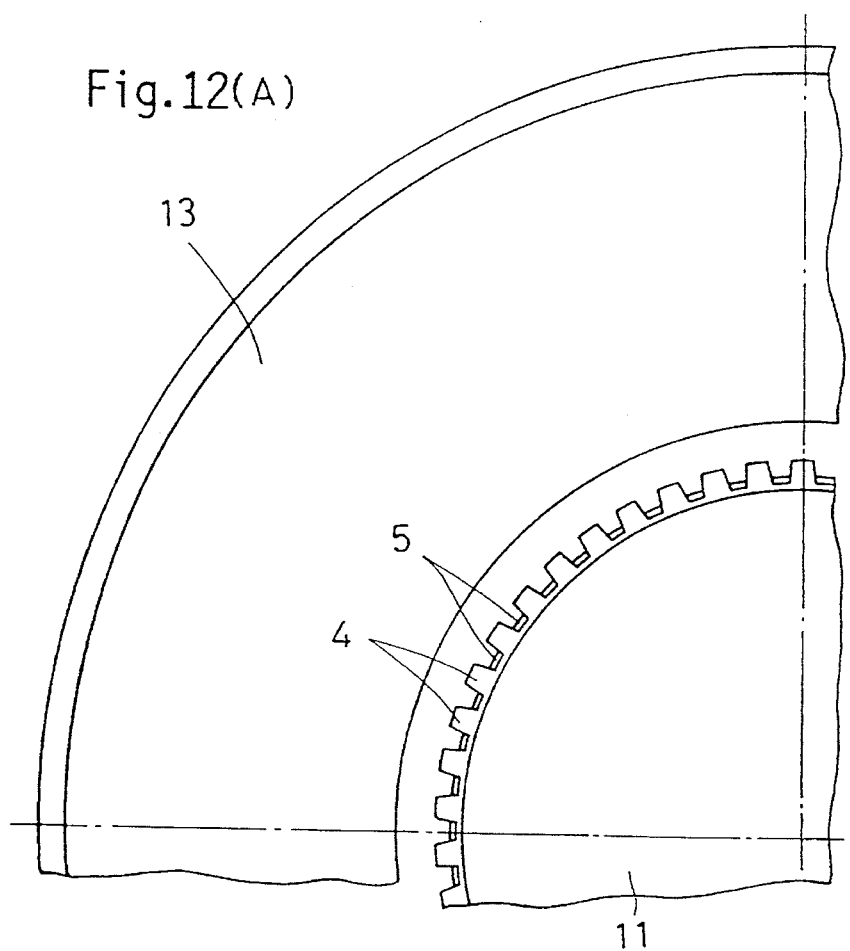
FIG. 12(A) is a partial enlarged plan view of the fifth embodiment forming apparatus.

FIG. 10 to FIG. 12 relate to a fifth embodiment of forming a ring-shaped product W1 having a tooth profile portion T in the inner peripheral surface shown in FIG. 10(B). In this case, the forming die comprises a lower punch (a first forming die) 11 formed as a round shaft possessing a tooth forming part 4 and a tip shaping part 5 on the outer peripheral surface, an upper punch (a second forming die) 12 having a tubular end (a pressing part) 12a, and a ring-shaped die (a shape-keeping die) 13. The upper and lower punches 11, 12 and die 13 are disposed concentrically with the ring-shaped die 13 positioned radially outwardly of the lower punch 11. The lower punch 11 is mounted on the upper surface of a press receiving plate 14. The die 13 is elevatably supported by plural guide rods 15 set up on the press receiving plate 14, and thrust upward to a specified height (the height shown in FIG. 11) by a return spring 16.

Figure 12B:
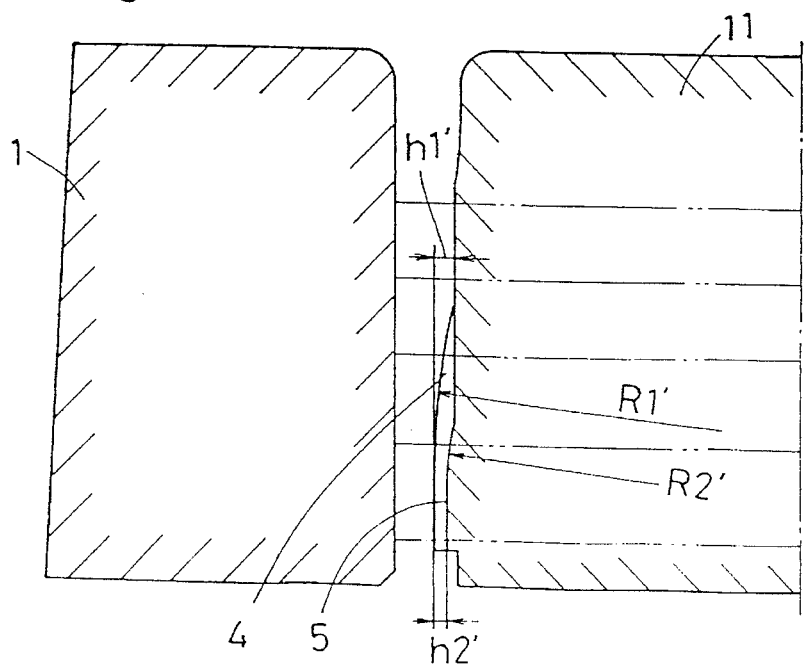
FIG. 12(B) is a partially enlarged sectional view.

The lower punch 11 is shown in an enlarged view in FIG. 12, in which the tooth forming part 4 and tip shaping part 5 are in the same shape as in the embodiment in FIG. 6. Reference codes R1' and R2' in FIG. 12(B) indicate the radii of the top faces of the tooth forming part 4 and tip shaping part 5, respectively, while h1' and h2' denote the projection height of the tooth forming part 4 and the height difference between projections 4 and 5, respectively.

The forming process is same as described above, that is, ring-shaped materials W are inserted in a space between the lower punch 11 and die 13 and sequentially pressed, and while several materials W are in the midst of processing, the press forming is carried out. During the formation of the tooth profile T, the die 13 is engaged with the outer peripheral surface of the material W to support it so as to suppress a deformation emerging in the outer peripheral surface and hence, the shape of the material W is kept appropriate thereby facilitating the formation. After forming, as shown in FIG. 11, when the upper punch 12 is raised, the die 13 and the material W in the midst of processing are lifted together by the thrust of the return spring 26 and the friction of the contact surfaces, and a completed toothed ring-shaped product W1 is left over on the press receiving plate 14. This ring-shaped product W1 is discharged outside.

In this method, the material W is squeezed by the tooth forming part 4 of the lower punch 11, and the inner peripheral surface thereof is shaped into a tooth profile, and furthermore, same as above, the shrinkage of the the tooth profile portion T of the material W produced in the early phase of processing is eliminated during the shaping process by the tip shaping part 5, and consequently, the tooth profile is adjusted to an accurate shape.

When the tooth height of the tooth profile of the ring-shaped product W1 is great, same as in the embodiment in FIG. 9, by increasing the projection height of the tooth forming part 4, an accurate tooth profile can be formed.

FIG. 13 shows a sixth embodiment. This embodiment is directed to a method of forming a tooth profile portion T on both the inner peripheral surface and the outer peripheral surface of the ring-shaped product W2. In this method, instead of the die 13 in FIG. 10, an outer die 13' is positioned radially outwardly of the lower punch (an inner die) 11. The outer die 13' has a tooth forming part 4 and a tip shaping part 5 on the inner peripheral surface. The tooth forming part 4 and tip shaping part 5 are in the same shape as in the embodiment in FIG. 6. The constitution of the other forming die is same as in the embodiment in FIG. 10. The forming process and the discharging method of the completed ring-shaped product W2 are also same as in the embodiment in FIG. 10. By inserting the material W into a space between the inner die 11 and the outer die 13' and pressing the material W by the upper punch 12, the tooth profile portion T is formed simultaneously on each of the inner and outer sides of the material W.

It is to be noted that in the fifth embodiment shown in FIGS. 10 to 12 and the sixth embodiment shown in FIG. 13, if the degree of the shrinkage 12 is not so great, the tip shaping part 5 can be omitted.

Although the present invention has been fully described in connection with the preferred embodiments thereof with reference to the accompanying drawings which are used only for the purpose of illustrator, those skilled in the art will readily conceive numerous changes and modifications within the framework of obviousness upon the reading of the specification herein presented of the present invention.

For example, in the fourth, fifth and sixth embodiments possessing the tip shaping part 5 shown in FIGS. 6 to 13, several materials W are left over in the forming die and earlier materials are sequentially discharged, but as in the first and second embodiments shown in FIGS. 1 to 4, one material W each may be put in the forming die and processed completely, and then next material W may be put in and processed. In such case, the punches 2, 12 should be in a shape not to interfere with the tooth forming part 4 and tip shaping part 5 by the front end portions. In this case, too, the stripper claw 25 and return spring 26 as shown in FIG. 1 may be provided, and the toothed ring-shaped product W0 may be securely dropped out from the punch 2 after forming. Accordingly, such changes and modifications are, unless they depart from the scope of the present invention as defined in the claims annexed hereto, to be construed as included therein.

Moreover, the method of the invention may be also applied in general forming of ring-shaped products possessing a tooth profile, aside from pulser rings, such as external tooth gears, internal tooth gears and ring-shaped splines.

What is claimed is:

1. A cold forming method for forming toothed ring-shaped products having a tooth profile portion formed in an outer peripheral surface of the ring-shaped product by plastic deformation processing of a ring-shaped workpiece, the method comprising the steps of:

preparing a first forming die having an inner peripheral surface provided with a tooth forming part having a shape corresponding to the shape of the tooth profile portion of the ring-shaped product;

preparing a second forming die provided with a pressing part for pressing an end surface of a ring-shaped workpiece and a shape-keeping part for engaging and supporting an inner peripheral surface of the ring-shaped workpiece, the pressing part having an outer diameter which is smaller than the minimum inner diameter of the tooth forming part; and displacing the first forming die and the second forming die relative to each other in an axial direction so that (1) the pressing part moves from a first end to a second end of the tooth forming part while engaging an end surface of the ring-shaped workpiece and (2) the shape-keeping part engages and supports an inner peripheral surface of the ring-shaped workpiece, to thereby press the ring-shaped workpiece through the tooth forming part in the axial direction and form the tooth profile portion in the ring-shaped workpiece.

2. The cold forming method as claimed in claim 1, further comprising the steps of:

providing a stripper claw adjacent the second end of the tooth forming part, the stripper claw being biased into the path of movement of the toothed ring-shaped product so as to press against an outer peripheral surface of the toothed ring-shaped product and subsequently engage a trailing end surface of the toothed ring-shaped product as the toothed ring-shaped product is pressed from the tooth forming part; and moving the second forming die relative to the first forming die toward the first end of the tooth forming part while the stripper claw engages a trailing end surface of the toothed ring-shaped product to thereby separate the toothed ring-shaped product from the second forming die.

3. A cold forming method for forming toothed ring-shaped products having a tooth profile portion formed in an outer peripheral surface of the ring-shaped product by plastic deformation processing of a ring-shaped workpiece, the method comprising the steps of:

preparing a first forming die having an inner peripheral surface provided with a tooth forming part having a shape corresponding to the shape of the tooth profile portion of the ring-shaped product;

preparing a second forming die provided with a mandrel for engaging and supporting an inner peripheral surface of a ring-shaped workpiece and a tubular punch for pressing an end surface of the ring-shaped workpiece, the tubular punch being mounted for axial slidable movement on the outer peripheral surface of the mandrel;

displacing the first forming die and the second forming die relative to each other in an axial direction so that (1) the tubular punch moves from a first end to a second end of the tooth forming part while engaging an end surface of the ring-shaped workpiece and (2) the mandrel engages and supports an inner peripheral surface of the ring-shaped workpiece, to thereby press the ring-shaped workpiece through the tooth forming part in the axial direction and form the tooth profile portion in the ring-shaped workpiece; and moving the mandrel toward the first end of the tooth forming part to thereby release the toothed ring-shaped product from the second forming die.

4. A cold forming method for forming toothed ring-shaped products having a tooth profile portion formed in an outer peripheral surface of the ring-shaped product by plastic deformation processing of a ring-shaped workpiece, the method comprising the steps of:

preparing a first forming die having an inner peripheral surface provided with a tooth forming part having a shape corresponding to the shape of the tooth profile portion of the ring-shaped product, the tooth forming part being provided with peripherally spaced grooves;

preparing a second forming die provided with a pressing part for pressing an end surface of a ring-shaped workpiece and a shape-keeping part for engaging and supporting an inner peripheral surface of the ring-shaped workpiece, the pressing part being provided with protrusions adapted to fit within the grooves of the tooth forming part; and displacing the first forming die and the second forming die relative to each other in an axial direction while (1) the pressing part engages an end surface of the ring-shaped workpiece, (2) the protrusions of the pressing part move axially within the grooves of the tooth forming part and (3) the shape-keeping part engages and supports an inner peripheral surface of the ring-shaped workpiece, to thereby press the ring-shaped workpiece through the tooth forming part in the axial direction and form the tooth profile portion in the ring-shaped workpiece.

5. A forming apparatus for forming toothed ring-shaped products having a tooth profile portion formed in an outer peripheral surface of the ring-shaped product by plastic deformation processing, the apparatus comprising:

a first forming die having an inner peripheral surface provided with a tooth forming part having a shape corresponding to the shape of the tooth profile portion of the ring-shaped product;

a second forming die provided with a pressing part for pressing an end surface of a ring-shaped workpiece and a shape-keeping part for engaging and supporting an inner peripheral surface of the ring-shaped workpiece, the pressing part having an outer diameter which is smaller than the minimum inner diameter of the tooth forming part; and means for displacing the first forming die and the second forming die relative to each other in an axial direction so that (1) the pressing part moves from a first end to a second end of the tooth forming part while engaging an end surface of the ring-shaped workpiece and (2) the shape-keeping part engages and supports an inner peripheral surface of the ring-shaped workpiece, to thereby press the ring-shaped workpiece through the tooth forming part in the axial direction and form the tooth profile portion in the ring-shaped workpiece.

6. The forming apparatus as claimed in claim 5, further comprising:

a stripper claw adjacent the second end of the tooth forming part, the stripper claw being biased into the path of movement of the toothed ring-shaped product so as to press against an outer peripheral surface of the toothed ring-shaped product and subsequently engage a trailing end surface of the toothed ring-shaped product as the toothed ring-shaped product is pressed from the tooth forming part; and means moving the second forming die relative to the first forming die toward the first end of the tooth forming part while the stripper claw engages a trailing end surface of the toothed ring-shaped product to thereby separate the toothed ring-shaped product from the second forming die.

7. A forming apparatus for forming toothed ring-shaped products having a tooth profile portion formed in an outer peripheral surface of the ring-shaped product by plastic deformation processing, the apparatus comprising:

a first forming die having an inner peripheral surface provided with a tooth forming part having a shape corresponding to the shape of the tooth profile portion of the ring-shaped product;

a second forming die provided with a mandrel for engaging and supporting an inner peripheral surface of a ring-shaped workpiece and a tubular punch for pressing an end surface of the ring-shaped workpiece, the tubular punch being mounted for axial slidable movement on the outer peripheral surface of the mandrel;

means for displacing the first forming die and the second forming die relative to each other in an axial direction so that (1) the tubular punch moves from a first end to a second end of the tooth forming part while engaging an end surface of the ring-shaped workpiece and (2) the mandrel engages and supports an inner peripheral surface of the ring-shaped workpiece, to thereby press the ring-shaped workpiece through the tooth forming part in the axial direction and form the tooth profile portion in the ring-shaped workpiece; and means for moving the mandrel away from the second end and toward the first end of the tooth forming part to thereby release the toothed ring-shaped product from the second forming die.

8. The forming apparatus as claimed in claim 7, wherein:

the tooth forming part of the first forming die is provided with peripherally spaced grooves; and the tubular punch is provided with protrusions adapted to fit within the grooves of the tooth forming part.

9. A forming apparatus for forming toothed ring-shaped products having a tooth profile portion formed in an outer peripheral surface of the ring-shaped product by plastic deformation processing, the apparatus comprising:

a first forming die having an inner peripheral surface provided with a tooth forming part having a shape corresponding to the shape of the tooth profile portion of the ring-shaped product, the tooth forming part being provided with peripherally spaced grooves;

a second forming die provided with a pressing part for pressing an end surface of a ring-shaped workpiece and a shape-keeping part for engaging and supporting an inner peripheral surface of the ring-shaped workpiece, the pressing part being provided with protrusions adapted to fit within the grooves of the tooth forming part; and means for displacing the first forming die and the second forming die relative to each other in an axial direction while (1) the pressing part engages an end surface of the ring-shaped workpiece, (2) the protrusions of the pressing part move axially within the grooves of the tooth forming part and (3) the shape-keeping part engages and supports an inner peripheral surface of the ring-shaped workpiece, to thereby press the ring-shaped workpiece through the tooth forming part in the axial direction and form the tooth profile portion in the ring-shaped workpiece.

* * * * *